C. C. GATES.
PROCESS OF APPLYING REPAIR TIRES TO WORN CASINGS.
APPLICATION FILED JUNE 5, 1919.
1,341,121. Patented May 25, 1920.
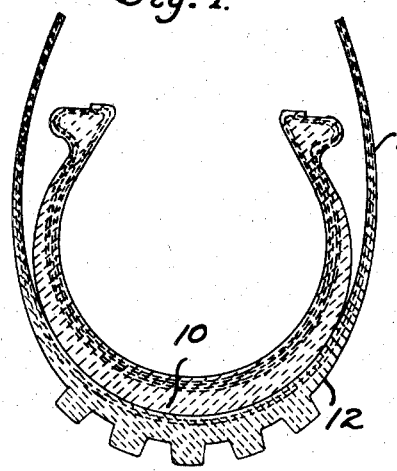
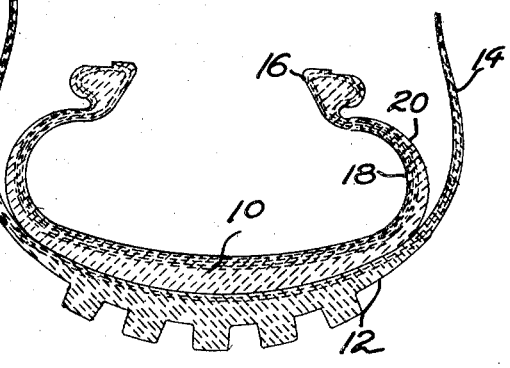
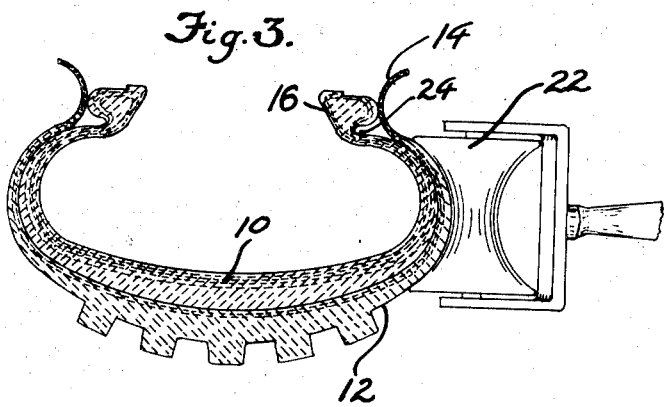
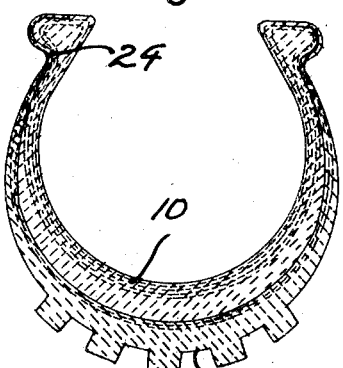
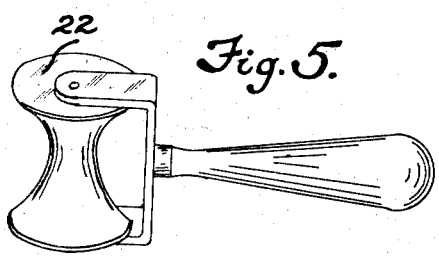
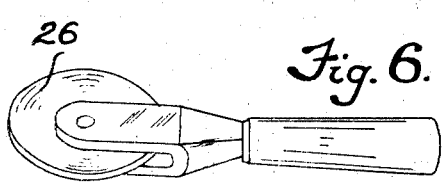
Inventor
C. C. Gates.
By
Attorney

UNITED STATES PATENT OFFICE.

CHARLES C. GATES, OF DENVER, COLORADO, ASSIGNOR TO THE GATES RUBBER COMPANY, OF DENVER, COLORADO, A CORPORATION OF COLORADO.

PROCESS OF APPLYING REPAIR-TIRES TO WORN CASINGS.

1,341,121.  Specification of Letters Patent.  Patented May 25, 1920.

Application filed June 5, 1919. Serial No. 301,918.

*To all whom it may concern:*

Be it known that I, CHARLES C. GATES, a citizen of the United States, residing at the city and county of Denver and State of Colorado, have invented certain new and useful Improvements in Processes of Applying Repair-Tires to Worn Casings; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to apply repair parts to casings in such a manner that the former will not be placed under strain when the tires are inflated. It is also an object of the invention to avoid the use of an expanding member while applying the repair parts.

Briefly, the invention comprises applying cement to one or both of the members, allowing it to become tacky, applying the tread portion of the repair tire to the tread of the casing while in normal form, deforming the sides of the casing to increase their superficial area, and then rolling down the sides of the repair member while the casing is in its deformed condition. In the drawing accompanying this specification:

Figure 1 indicates the application of the tread of the repair tire to the casing.

Fig. 2 illustrates the deformation of the casing prior to rolling down the sides of the repair part.

Fig. 3 shows the sides of the repair part being rolled onto the sides of the casing with a concaved roller.

Fig. 4 indicates the process completed.

Fig. 5 is a perspective of the concave roller used in roling down the sides of the repair member; and Fig. 6 is a perspective of the tool for stitching repair parts into the bead grooves.

The casing 10 is first buffed off to present a smooth surface and is then treated with cement, preferably two coats, which is allowed to dry until it becomes very tacky. This degree of tackiness must be such that parts, when once joined, will not change their relation when deformed. The tread portion only of the repair tire 12 is applied to the tread of the casing and is rolled down well, the sides 14 of the part being maintained out of contact with the casing. As shown in Fig. 2, the casing is then deformed, as by resting the tread on a table or other support and pressing down upon the beads 16, this being done while the side portions 14 of the repair member are still out of contact with the sides of the casing. The inner faces 18 of the casing sides, being largely fabric, retain their normal extent, but the outer faces 20, being of elastic material, stretch sufficiently to present a superficial surface considerably greater than when in the normal position shown in Fig. 1. While the parts 20 are in this deformed state, the sides 14 of the repair member in normal or unstretched condition, are rolled firmly into contact with the sides of the casing by means of the concave roller 22, as illustrated in Fig. 3.

As above indicated, the tackiness of the cement is sufficient that the parts retain their relative positions when the tire resumes its normal state, as shown in Fig. 4. The sides 14 are then stitched into the bead grooves 24 by means of the stitching tool 26, and rolled into position around the heels of the beads 16.

It will be apparent that the increase in area of the sides 20 produced when the parts are deformed will produce a corresponding contraction in the sides 14 when a normal position is resumed. This is sufficient to compensate for the expansion of the casing after inflation and will thereby relieve any strain upon the sides of the repair member.

I claim:

1. A process of applying a repair tire to a casing, comprising applying cement, applying a portion of one member to a portion of the other, deforming a part of the one member and then applying another portion of the other member thereto while in the deformed state.

2. A process of applying a repair tire to a casing, comprising applying cement, applying the repair member to the tread of the casing, pressing the same down, deforming the casing at its sides to increase its external superficial area, and pressing down the sides of the repair member onto the deformed sides of the casing.

3. A process of applying a repair tire to a casing, comprising applying cement, allowing the cement to become very tacky, applying the tread of the repair member to the tread of the casing, and pressing down the same, deforming the casing at its sides to increase its external superficial area, and pressing down the sides of the repair member onto the deformed sides of the casing.

4. A process of applying a repair tire to a casing, comprising applying cement, allowing said cement to become sufficiently tacky to hold applied parts in relative position when their form is changed, applying the tread of the repair member to the tread of the casing and pressing down the same, deforming the casing at its sides to increase its external superficial area, and pressing down the sides of the repair member while said sides are in normal or unstretched condition onto the deformed sides of the casing.

In testimony whereof I affix my signature.

CHARLES C. GATES.